United States Patent Office 2,956,938
Patented Oct. 18, 1960

2,956,938

SYNTHESIS OF AMINES

Clifford Wheaton Vaughan, Wilmington, Del., assignor to E. I. du Pont de Nemours and Company, Wilmington, Del., a corporation of Delaware No Drawing. Filed Sept. 4, 1956, Ser. No. 607,570

12 Claims. (Cl. 204—154)

This invention is concerned with a new process for synthesizing aliphatic amines.

There are many known methods for the synthesis of aliphatic amines. All of these, including the original synthesis by Hoffman in 1849, involve reactions in which the amine group comes to occupy a position in an organic molecule originally occupied by some other functional group in the starting material. The amine group may thus replace a halide substituent, the carbonyl group of an amide, the oxygen of an aldehyde group, or the like. Direct synthesis of amines from ammonia and the corresponding aliphatic hydrocarbons represents a highly desirable technical goal since it would avoid the necessity of first preparing a functional precursor.

An object of this invention is consequently provision of a novel and useful method for synthesizing aliphatic amines.

A specific object is provision of a method for synthesizing primary amines directly from an aliphatic hydrocarbon and ammonia.

The above-mentioned and yet further objects are achieved in accordance with this invention by a process in which (1) an intimate mixture of a saturated aliphatic (including cycloaliphatic) hydrocarbon and ammonia is subjected to ionizing radiation in such manner that an excess of ammonia is present at all times during irradiation and (2) the aliphatic amine which is formed is isolated.

By the term "ionizing radiation" we mean to include both radiation in the form sometimes regarded as particle radiation and radiation in the form sometimes regarded as ionizing electromagnetic radiation. To be effective in the process of this invention the ionizing radiation employed must have an energy equivalent to at least 15 electron volts.

By "particle radiation" is meant an emission of accelerated electrons or nuclear particles such as protons, neutrons, alpha-particles, deuterons, beta-particles, or the like, so that the said particles impinge upon the mixture of ammonia and hydrocarbon. The charged particles may be accelerated to high speeds by means of a suitable voltage gradient, in such devices as a resonant cavity accelerator, a Van de Graaff accelerator, a betatron, a synchrotron, a cyclotron or the like, as is well known to those skilled in the art. Neutron radiation may be produced by bombardment of selected light metal (e.g., beryllium) targets with high energy positive particles. In addition, radiation suitable for carrying out the process of the invention may be obtained from an atomic pile, or from radio active isotopes or from other natural or artificial radioactive materials.

By "ionizing electromagnetic radiation" is meant radiation of the type produced when a metal target (e.g., tungsten or gold) is bombarded by electrons possessing appropriate energy. Such radiation is conventionally termed X-ray. In addition to X-rays produced as indicated above, ionizing electromagnetic radiation suitable for carrying out the process of the invention may be obtained from a nuclear reactor ("pile") or from natural or artificial radioactive material, for example, cobalt 60. In all of these latter cases the radiation is conventionally termed gamma rays. While gamma radiation is distinguished from X-radiation primarily with reference to its origin, it may be noted that the spectral distribution of X-rays is different from that of gamma rays. The latter are frequently essentially monochromatic while X-rays produced by electron bombardment of a target never are.

Any saturated aliphatic hydrocarbon may be used in this process. Thus, methane, ethane, propane, butane, and the like may be mixed with ammonia and subjected to ionizing radiation by circulating the mixed gases through a glass tube as in the examples which follow. Alternatively the mixed gases may be compressed in a pressure vessel, such as a metal bomb, and subjected to a penetrating form of ionizing radiation, such as X-rays on gamma rays, which can be readily impinged on the mixture of reactants through the metal walls of the container. The corresponding primary amine, i.e., methylamine, ethylamine, propylamine, butylamine, etc., is isolated from the reaction mixture by low-temperature distillation.

Saturated aliphatic hydrocarbons which are liquids at ordinary temperatures, such as pentane, hexane, methylcyclohexane, octane, 2,2,4-trimethylpentane, decane, decalin, hexadecane, and the like, may also be reacted with ammonia under the influence of ionizing radiation. The corresponding amines are isolated by fractional distillation. Aliphatic hydrocarbons which are solid at ordinary temperatures, such as n-octadecane, n-hexacontane, paraffin waxes and the like, are preferably employed at temperatures above their melting points. Under these conditions, they may be irradiated in admixture with ammonia in the same manner as a gas. The corresponding primary amine products may be isolated from the reaction mixture by fractional crystallization from a suitable solvent, such as diethyl ether.

The quantity of ammonia used or the hydrocarbon: ammonia ratio is not sharply critical. The molar ratio of hydrocarbon to ammonia may vary from about 1:50 to 50:1. It is preferred, however, to operate in the presence of a slight excess of ammonia over that required to form a primary monoamine from the given hydrocarbon. The hydrocarbon: ammonia mole ratio should, therefore, be slightly less than 1:1.

In the process of this invention it is necessary for the ammonia and the aliphatic hydrocarbon to be in intimate contact during the time of irradiation. It is, therefore, preferred that the hydrocarbon be a liquid or a gas at the temperature of irradiation in order to facilitate mixing of the reactants. When the hydrocarbon is a liquid, the ammonia may be mechanically dispersed therein during irradiation. With most hydrocarbon liquids, the solubility of ammonia in the liquid increases with increase in pressure and the use of superatmospheric pressure is accordingly preferred. Pressures up to 1000 atm. and above may be employed. This practice permits carrying out the process of this invention by irradiating a solution of ammonia in a liquid hydrocarbon without the presence of a separate gas phase. In operating at high pressures with heavy containers, X-rays and gamma rays are preferred as radiation. When the hydrocarbon is a gas at the temperature of irradiation, the use of superatmospheric pressures on the mixture of hydrocarbon and ammonia permits increased efficiency of absorption of the radiation employed and, therefore, is preferred. Alternatively the irradiation may be carried out at atmospheric pressure and low temperatures where ammonia is a liquid and the hydrocarbon may be a solid which is dissolved or dispersed therein.

Minor amounts of water may be present during the reaction along with the mixture of aliphatic hydrocarbon and ammonia during the process of irradiation. Since the water causes some loss of the reactants through side reactions, anhydrous reactants are preferred.

It will be readily understood that the principal product formed in the present process is a primary monoamine derivative of the starting aliphatic hydrocarbon. When the hydrocarbon contains more than one configurational type of C-H bond, as in isobutane, the product contains a mixture of the possible isomers, i.e., isobutylamine and tertiary butylamine. If desired, these may be separated by fractionation.

The ionizing radiation utilized may cause the dehydrogenative coupling of one or more molecules of the starting aliphatic hydrocarbon to yield a higher molecular weight hydrocarbon which in turn is aminated during the process to yield a high molecular weight by-product amine. This can also be separated from the other materials by fractionation.

The temperature used in the process may be varied within wide limits from low temperatures in the range of $-100°$ C. and below up to the decomposition temperature of the aliphatic hydrocarbon or the amine product, whichever is lower.

The dosage of ionizing radiation employed must be at least $10^4$ rads to produce useful amount of amination, one rad being the quantity of radiation which will result in an energy absorption of 100 ergs per gram of irradiated material.

The isolation of the product amine may be carried out by distillation, fractional crystallization, selective extraction with a suitable organic solvent, chromatography, or the like, or the amine may be first converted to a derivative such as a hydrohalide salt, benzenesulfonamide, p-toluenesulfonamide, phenylthiourea, and the like, and isolated in the form of the derivative in any of the usual techniques known in the art.

There follow some non-limiting examples which illustrate the invention in more detail.

*Example 1*

Cyclohexane (160 ml.) intimately mixed with gaseous ammonia was continuously circulated at atmospheric pressure through a glass tube of 15 mm. outside diameter and 13 mm. inside diameter. Twenty centimeters of its length was exposed to a beam of 2-mev. electrons having a current of 5 microamps./cm.$^2$ of cross section. The temperature of the mixture was 7–8° C. After 15 minutes of irradiation the mixture was distilled at atmospheric pressure through a 24" spinning band column to remove ammonia and the bulk of unchanged cyclohexane. The residue in the still-pot weighed 9.6 g.

Titration of a small portion of the residue with 0.01 N hydrochloric acid indicated that it contained 0.59 milliequivalents of base. Paper chromatography of a drop of the residue, following the procedure of Bremner and Kenten, Biochem. J. 49, 651 (1951), indicated that the base is about half cyclohexylamine and half an amine of higher molecular weight, probably a 12-carbon monoamine.

In order to separate the cyclohexylamine from higher-boiling amine, 13 ml. of m-xylene (which has about the same boiling point as cyclohexylamine) and 10 ml. of tetrahydronaphthalene were added to the residue. The mixture was distilled through a 24" spinning band column and the m-xylene fraction was separated. Titration of a small portion with 0.01 N hydrochloric acid indicated the presence of 0.31 millimoles of cyclohexylamine. 2,4-dinitrochlorobenzene (56 mg.) was dissolved in the xylene distillate and the mixture refluxed one hour. The solution was evaporated to dryness at reduced pressure and the residue, a yellow solid, recrystallized from ethanol. The recrystallized solid weighed 22 mg. and melted at 152–154° C. It was identified as N-cyclohexyl-2,4-dinitroaniline by its melting point, infrared spectrum and X-ray diffraction pattern, all of which were identical with those of an authentic sample.

*Example 2*

Cyclohexane (10 g.) was placed in a flat "Pyrex" brand glass cell fitted with a reflux condenser open to the atmosphere and cooled with a mixture of acetone and solid carbon dioxide. About 16 g. of liquid ammonia was added through the condenser and the assembly kept at about $-33°$ C. by the refluxing ammonia. The cyclohexane froze on first contact with the liquid ammonia and then at least part of the cyclohexane dissolved in the liquid ammonia. The cell was substantially filled by the mixture of cyclohexane and ammonia.

The assembly was then positioned so that the cell intercepted a beam of 2-mev. electrons with a total current of 250 microamperes for 15 minutes. Excess ammonia was allowed to evaporate.

The presence of cyclohexylamine in the residue was demonstrated by conversion to the benzamide as follows:

To the residue was added 0.4 ml. of benzoyl chloride and 4.0 ml. of anhydrous pyridine. The mixture was heated at 70–80° C. for 1 hour and then poured into 25 ml. of water. By chromatography with benzene-ether on alumina, 0.097 g. of N-cyclohexylbenzamide was recovered in the form of white crystals melting at 148–149° C.

The embodiments of the invention in which an exclusive property or privilege is claimed are defined as follows:

1. The method of forming an amine which comprises subjecting a mixture of a saturated aliphatic hydrocarbon and ammonia to ionizing radiation of an energy equivalent to at least 15 electron volts and subsequently separating an amine from the reaction mixture.

2. The invention of claim 1 in which the minimum dosage of ionizing radiation is $10^4$ rads.

3. The invention of claim 1 in which the hydrocarbon is cycloaliphatic.

4. The invention of claim 1 in which the ionizing radiation is particulate.

5. The invention of claim 4 in which the ionizing radiation is accelerated electrons.

6. The invention of claim 1 in which the ionizing ratiation is electromagnetic.

7. The invention of claim 6 in which the ionizing radiation is X-rays.

8. The invention of claim 6 in which the ionizing radiation is γ-rays.

9. The invention of claim 1 in which the ammonia is a gas.

10. The invention of claim 1 in which the ammonia is a liquid.

11. The method of forming cyclohexylamine which comprises irradiating a mixture of cyclohexane and ammonia with ionizing radiation and subsequently separating cyclohexylamine from the reaction mixture.

12. The invention of claim 2 in which the ionizing radiation is accelerated electrons.

References Cited in the file of this patent

UNITED STATES PATENTS 2,749,297  Thomas _____ June 5, 1956

FOREIGN PATENTS 665,263  Great Britain _____ Jan. 23, 1952

OTHER REFERENCES

Bovey: "Effects of Ionizing Radiation on Natural and Synthetic High Polymers," pp. 1–47 (1958).